United States Patent
Choi (10) Patent No.: US 11,476,512 B2
(45) Date of Patent: Oct. 18, 2022

(54) COOLING EFFICIENCY-ENHANCED BATTERY MODULE AND BATTERY PACK COMPRISING SAME

(71) Applicant: LG Chem, Ltd., Seoul (KR)

(72) Inventor: Yun-Ki Choi, Daejeon (KR)

(73) Assignee: LG Energy Solution, Ltd.

( * ) Notice: Subject to any disclaimer, the term of this patent is extended or adjusted under 35 U.S.C. 154(b) by 154 days.

(21) Appl. No.: 16/765,262

(22) PCT Filed: Jun. 11, 2019

(86) PCT No.: PCT/KR2019/007012
§ 371 (c)(1),
(2) Date: May 19, 2020

(87) PCT Pub. No.: WO2020/022643
PCT Pub. Date: Jan. 30, 2020

(65) Prior Publication Data
US 2020/0373634 A1    Nov. 26, 2020

(30) Foreign Application Priority Data

Jul. 26, 2018 (KR) .......................... 10-2018-0087424

(51) Int. Cl.
| | |
|---|---|
| *H01M 10/613* | (2014.01) |
| *H01M 10/653* | (2014.01) |
| *H01M 10/647* | (2014.01) |
| *H01M 10/6551* | (2014.01) |
| *H01M 50/20* | (2021.01) |

(52) U.S. Cl.
CPC ....... *H01M 10/613* (2015.04); *H01M 10/647* (2015.04); *H01M 10/653* (2015.04); *H01M 10/6551* (2015.04); *H01M 50/20* (2021.01)

(58) Field of Classification Search
CPC ............. H01M 10/613; H01M 10/647; H01M 10/653; H01M 10/6551; H01M 50/20; H01M 50/103; H01M 50/209; H01M 50/414; H01M 50/24; Y02E 60/10
See application file for complete search history.

(56) References Cited

U.S. PATENT DOCUMENTS

| | | | |
|---|---|---|---|
| 2011/0097644 A1 | 4/2011 | Kinoshita | |
| 2014/0154547 A1 | 6/2014 | Anderson et al. | |
| 2016/0197386 A1* | 7/2016 | Moon | H01M 50/20 429/120 |
| 2018/0047954 A1* | 2/2018 | Yoo | H01M 10/647 |
| 2018/0062226 A1* | 3/2018 | Raiser | H01M 10/6554 |
| 2018/0076493 A1* | 3/2018 | Park | H01M 50/24 |
| 2018/0114957 A1 | 4/2018 | Kim et al. | |
| 2018/0337375 A1* | 11/2018 | Kellner | H01M 10/6567 |
| 2019/0044201 A1 | 2/2019 | Jo et al. | |
| 2019/0214618 A1 | 7/2019 | Nakamura et al. | |

FOREIGN PATENT DOCUMENTS

| | | |
|---|---|---|
| EP | 3246978 A1 | 11/2017 |
| EP | 3264492 A1 | 1/2018 |
| JP | 2010021129 A | 1/2010 |
| JP | 2013125617 A | 6/2013 |
| KR | 101636378 B1 | 7/2016 |
| KR | 20170014924 A | 2/2017 |
| KR | 20170021122 A | 2/2017 |
| KR | 20170030070 A | 3/2017 |
| KR | 20180039453 A | 4/2018 |
| WO | 2016137303 A1 | 9/2016 |
| WO | 2018079019 A1 | 5/2018 |

OTHER PUBLICATIONS

Extended European Search Report including Written Opinion for Application No. 19840729.8 dated May 25, 2021, 8 pages.
International Search Report for Application No. PCT/KR2019/007012 dated Sep. 19, 2019, 2 pages.

* cited by examiner

*Primary Examiner* — Muhammad S Siddiquee
(74) *Attorney, Agent, or Firm* — Lerner, David, Littenberg, Krumholz & Mentlik, LLP (57) ABSTRACT

A battery module includes: a module body including a cell assembly stack formed by stacking a plurality of cell assemblies and a module case configured to accommodate the cell assembly stack; and a pair of heatsinks disposed at an upper portion and a lower portion of the module body, respectively, to dissipate heat transferred from the module case. Each of the cell assemblies includes: at least one battery cell; a cartridge configured to accommodate the battery cell; and a pair of thermally conductive resin layers filled in respective empty spaces formed between a top end of the battery cell and the cartridge and between a bottom end of the battery cell and the cartridge.

8 Claims, 9 Drawing Sheets

COOLING EFFICIENCY-ENHANCED BATTERY MODULE AND BATTERY PACK COMPRISING SAME

CROSS-REFERENCE TO RELATED APPLICATIONS

The present application is a national phase entry under 35 U.S.C. § 371 of International Application No. PCT/KR2019/007012 filed Jun. 11, 2019, which claims priority to Korean Patent Application No. 10-2018-0087424 filed on Jul. 26, 2018, the disclosures of which are incorporated herein by reference.

TECHNICAL FIELD

The present disclosure relates to a battery module with improved cooling efficiency and a battery pack including the battery module, and more particularly, to a battery module exhibiting improved cooling efficiency and having a simplified manufacturing process by using cooling fins and a thermally conductive resin layer, and a battery pack including the battery module.

BACKGROUND ART

Secondary batteries commercially used at present include nickel-cadmium batteries, nickel-hydrogen batteries, nickel-zinc batteries, and lithium secondary batteries. Among them, the lithium secondary batteries are highly notable due to substantially no memory effect to ensure free charging and discharging, very low self-discharge rate and high energy density, compared to nickel-based secondary batteries.

The lithium secondary battery mainly uses a lithium-based oxide and a carbonaceous material as a positive electrode active material and a negative electrode active material, respectively. The lithium secondary battery includes an electrode assembly in which a positive electrode plate and a negative electrode plate respectively coated with a positive electrode active material and a negative electrode active material are disposed with a separator being interposed therebetween, and an exterior, namely a battery case, for hermetically accommodating the electrode assembly along with an electrolyte.

Generally, the lithium secondary battery may be classified into a can-type secondary battery in which the electrode assembly is included in a metal can and a pouch-type secondary battery in which the electrode assembly is included in a pouch made of aluminum laminate sheets, depending on the shape of the exterior.

Recently, secondary batteries have been widely used not only in small-sized devices such as portable electronic devices but also in medium-sized or large-sized devices such as vehicles and power storage systems. When used in the medium-sized or large-sized devices, a large number of secondary batteries are electrically connected to increase capacity and power. In particular, pouch-type cells are widely used for the medium-sized or large-sized devices because of they may be easily stacked.

However, the pouch-type cell is generally packaged in the battery case made of a laminate sheet of aluminum and polymer resin, and thus its mechanical stiffness is not large. Thus, when the battery module including a plurality of pouch-type cells is configured, a frame is often used to protect the secondary batteries from external impact, prevent shaking thereof, and facilitate stacking thereof.

The frame may be called by different names, such as a cartridge. In many cases, the frame has a rectangular shape having an empty center portion, and at this time, four sides of the frame surround the outer circumference of the pouch-type cell. In addition, a plurality of frames are stacked to configure the battery module, and the pouch-type cells may be placed in the empty space inside the frame when the frames are stacked.

Figure 1:
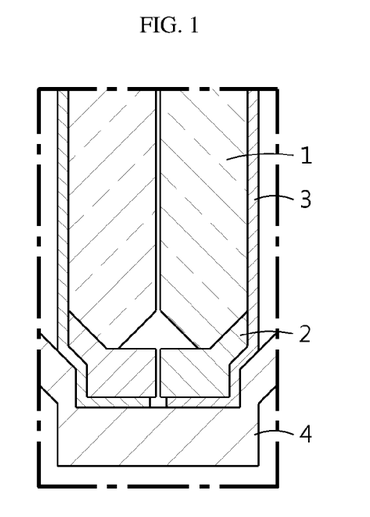
FIG. 1 is a diagram showing a conventional battery module to which a cooling fin is applied.

Meanwhile, referring to FIG. 1, a conventional battery module structure is shown. If a plurality of pouch-type cells 1 are stacked by using a plurality of frames 2, in the conventional battery module structure, plate-shaped cooling fins 3 are applied on the outer surfaces of each of the pair of pouch-type cells 1, thereby increasing the cooling efficiency.

The secondary battery may be used in high temperature environments such as summer, and the secondary battery may also generate heat from itself. At such time, if a plurality of secondary batteries are stacked on each other, the temperature of the secondary batteries may become higher. If the temperature is higher than a proper temperature, the performance of the secondary batteries may deteriorate, and in severe cases, explosion or ignition may occur. Thus, when the battery module is configured, the cooling fins 3 are applied to contact the surface of the pouch-type cell 1, and the cooling fins 3 are brought into contact with a cooling plate 4 located therebelow to prevent the overall temperature of the battery module from rising. This configuration is used frequently.

However, if the cooling fin 3 usually made of a metal material is interposed between the pouch-type cells 1 facing each other to configure the battery module, the process of stacking/fixing the pouch-type cells 1 and the cooling fin 3 takes a lot of time, resulting in deteriorated productivity. Also, it is difficult to obtain sufficient cooling effect only with the cooling fin 3.

Thus, there is an urgent need to develop a battery module structure, which solves the problem in the above process and has an additional cooling path in addition to the cooling path made of the pouch-type cell-cooling fin.

DISCLOSURE

Technical Problem

The present disclosure is designed to solve the problems of the related art, and therefore the present disclosure is directed to simplifying the process of coupling a cooling fin and pouch-type cells and the process of coupling the pouch-type cells in a module case, and to improving the cooling efficiency by diversifying the cooling path of the battery module.

However, the technical problem to be solved by the present disclosure is not limited to the above, and other objects not mentioned herein will be understood from the following description by those skilled in the art.

Technical Solution

In one aspect of the present disclosure, there is provided a battery module, comprising: a module body including a cell assembly stack formed by stacking a plurality of cell assemblies and a module case configured to accommodate the cell assembly stack; and a pair of heatsinks disposed at an upper portion and a lower portion of the module body to dissipate heat transferred from the module case, wherein the cell assembly includes: at least one battery cell; a cartridge configured to accommodate the battery cell; and a pair of thermally conductive resin layers filled in empty spaces formed between a top end of the battery cell and the cartridge and between a bottom end of the battery cell and the cartridge.

The cartridge may have a rectangular parallelepiped shape with both open sides, and the battery cell may be in contact with an inner surface of the cartridge.

The cartridge may have a rectangular parallelepiped shape with both open sides, and an insulation sheet may be interposed between the battery cell and an inner surface of the cartridge.

The top end and the bottom end of the battery cell may be in contact with the thermally conductive resin layer.

The cartridge may have an injection hole for injecting a resin paste to form the thermally conductive resin layer and a discharge hole for discharging the injected resin, which are formed at a top surface and a bottom surface thereof.

The injection hole may be formed at a center portion of the bottom surface of the cartridge, and the discharge hole may be formed at both longitudinal ends of the bottom surface of the cartridge.

The injection hole may be formed at a center portion of the top surface of the cartridge, and the discharge hole may be formed at both longitudinal ends of the top surface of the cartridge.

The battery module may further comprise a pair of thermal interface material (TIM) layers interposed between the module body and the heatsink.

Meanwhile, a battery pack according to an embodiment of the present disclosure may comprise at least one battery module according to an embodiment of the present disclosure.

Advantageous Effects

According to one aspect of the present disclosure, since the process for coupling the cooling fins and the battery module is simplified, it is possible to improve productivity.

According to another aspect of the present disclosure, since an additional cooling path capable of simply and efficiently dissipating heat is provided in addition to the heat dissipation path using the cooling fins, it is possible to improve the cooling efficiency.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustration only, not intended to limit the scope of the disclosure, so it should be understood that other equivalents and modifications could be made thereto without departing from the scope of the disclosure.

First, the overall structure of a battery module according to an embodiment of the present disclosure will be described in brief with reference to FIGS. 2 and 3.

Figure 2:
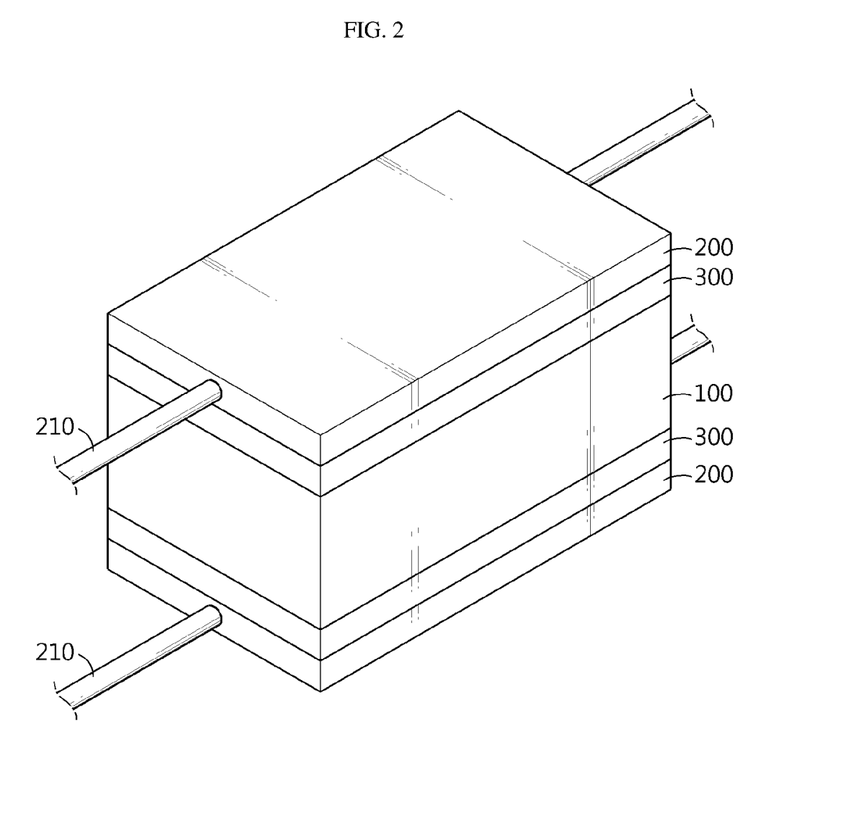
FIG. 2 is a perspective view showing a battery module according to an embodiment of the present disclosure.
Figure 3:
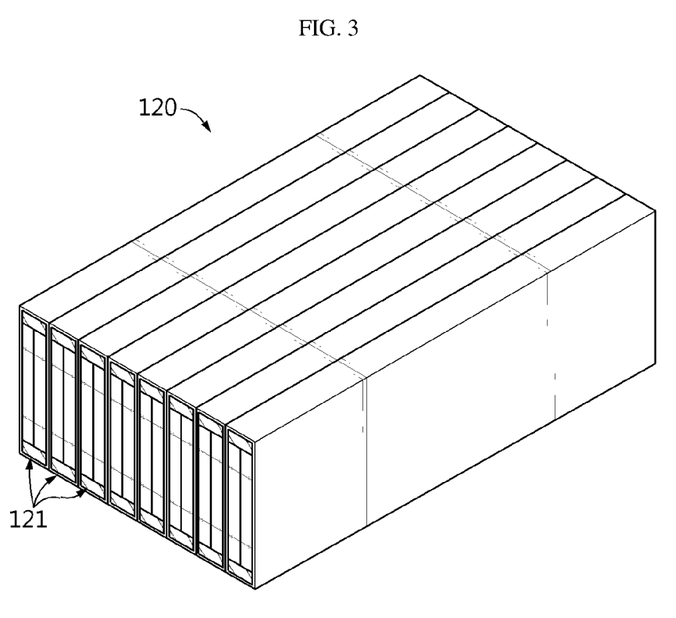
FIG. 3 is a perspective view showing a cell assembly stack applied to the battery module according to an embodiment of the present disclosure.

FIG. 2 is a perspective view showing a battery module according to an embodiment of the present disclosure, and FIG. 3 is a perspective view showing a cell assembly stack applied to the battery module according to an embodiment of the present disclosure.

Referring to FIG. 2, the battery module according to an embodiment of the present disclosure may include a module body 100 and a heatsink 200 disposed at an upper portion and a lower portion of the module body 100, and may further include a thermal interface material (TIM) layer 300 disposed between the module body 100 and the heatsink 200.

Figure 10:
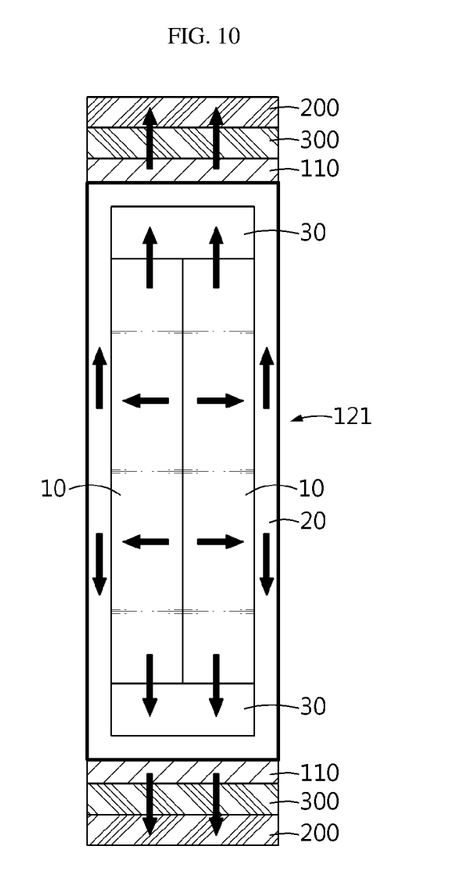
FIG. 10 is a diagram showing a path for cooling in the battery module according to an embodiment of the present disclosure.

The module body 100 is obtained by accommodating a cell assembly stack 120, in which a plurality of cell assemblies 121 are stacked, in a module case 110 (see FIG. 10). The plurality of cell assemblies 121 are stacked such that the widest surfaces of the cell assemblies 121 face and contact each other.

The heatsink 200 is disposed at the upper portion and the lower portion of the module body 100 and is in direct/indirect contact with a top surface and a bottom surface of the module case 110 to discharge heat to the outside. That is, the heat generated from the module body 100, more specifically the heat generated from battery cells 10, explained later, and conducted to the module case 110 are dissipated to the outside by means of the heatsink 200.

In order to improve the heat dissipation efficiency, the heatsink 200 may have a space capable of accommodating cooling fluid (e.g., water) in a liquid state therein. In this case, the heatsink 200 may include a pipe 210 capable of introducing the cooling fluid into the inner space and discharging the introduced cooling fluid to the outside.

The heatsink 200 may be made of a metal material with excellent thermal conductivity, such as copper or copper alloy.

Meanwhile, as described above, the battery module according to an embodiment of the present disclosure may further include the TIM layer 300 interposed between the module body 100 and the heatsink 200. The TIM layer 300 may allow the heat to be transferred from the module body 100 to the heatsink 200 more efficiently by preventing the formation of an empty space due to the top surface and the bottom surface of the module body 100 not being in contact with the heatsink 200.

The TIM layer 300 is made of a thermal interface material (TIM). For example, the TIM may employ a thermal grease including materials with high thermal conductivity and low electrical conductivity, such as aluminum oxide ($Al_2O_3$), boron nitride (BN), zinc oxide (ZnO), and the like.

If the module body 100 and the heatsink 200 are in direct contact with each other without the TIM layer 300 interposed therebetween, the heat transfer path may be shorter than the case where the TIM layer 300 is interposed. However, due to empty spaces that may be created at the bonding interface between the surface of the module case 110 made of metal or plastic and the surface of the heatsink 200 made of metal, the actual thermal conductivity may be further deteriorated.

Thus, the TIM layer 300 may be interposed between the module body 100 and the heatsink 200 in order to completely fill the empty space with the TIM and thus improve substantial thermal conductivity.

Next, the cell assembly 121 applied to the battery module according to an embodiment of the present disclosure will be described in detail with reference to FIGS. 4 to 8.

Figure 4:
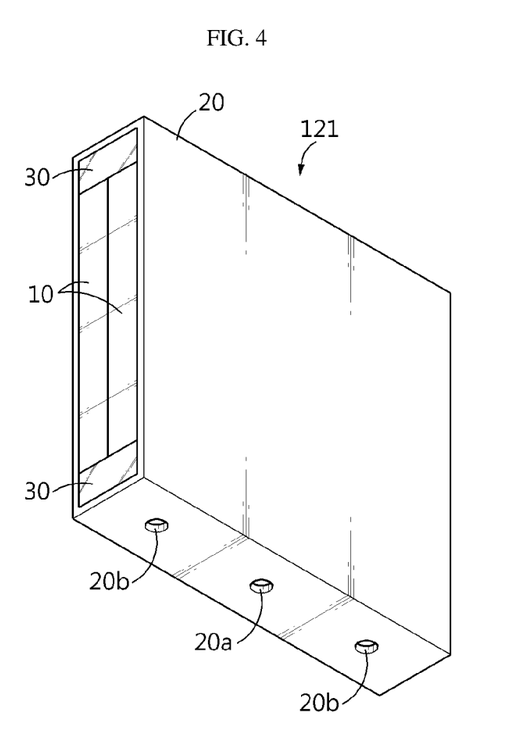
FIG. 4 is a perspective view showing a cell assembly applied to the battery module according to an embodiment of the present disclosure.
Figure 5:
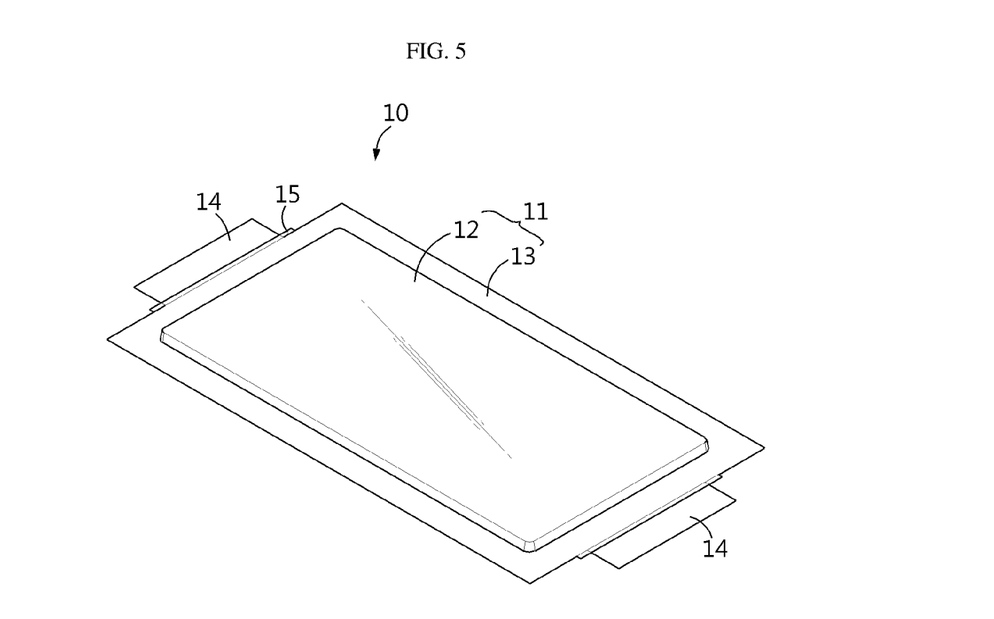
FIG. 5 is a perspective view showing a battery cell provided to the cell assembly depicted in FIG. 4.
Figure 6:
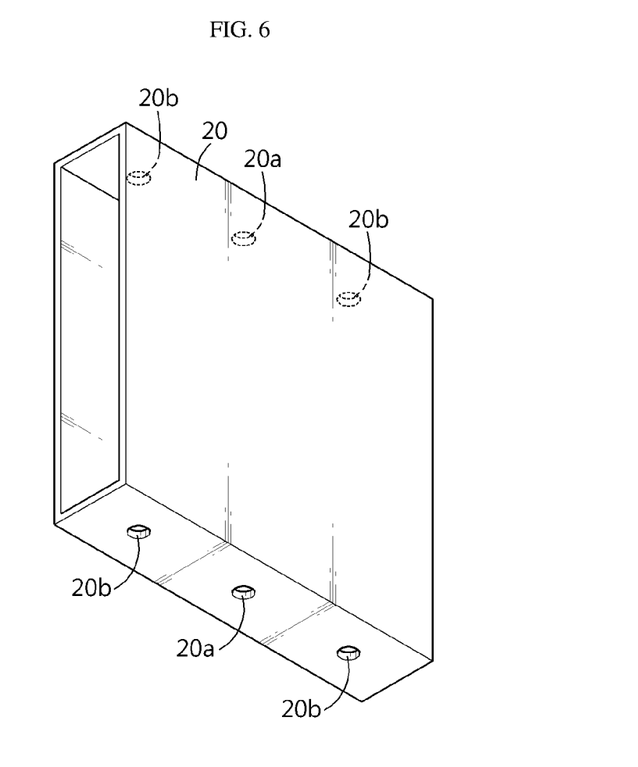
FIG. 6 is a perspective view showing a cartridge provided to the cell assembly depicted in FIG. 4.
Figure 7:
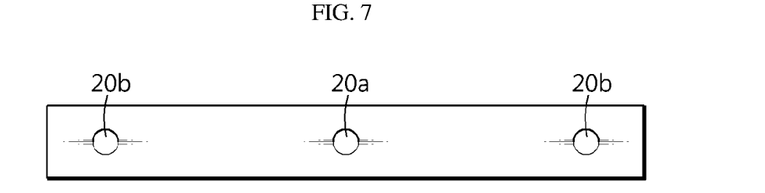
FIG. 7 is a plan view showing a bottom surface of the cartridge depicted in FIG. 6.
Figure 8:
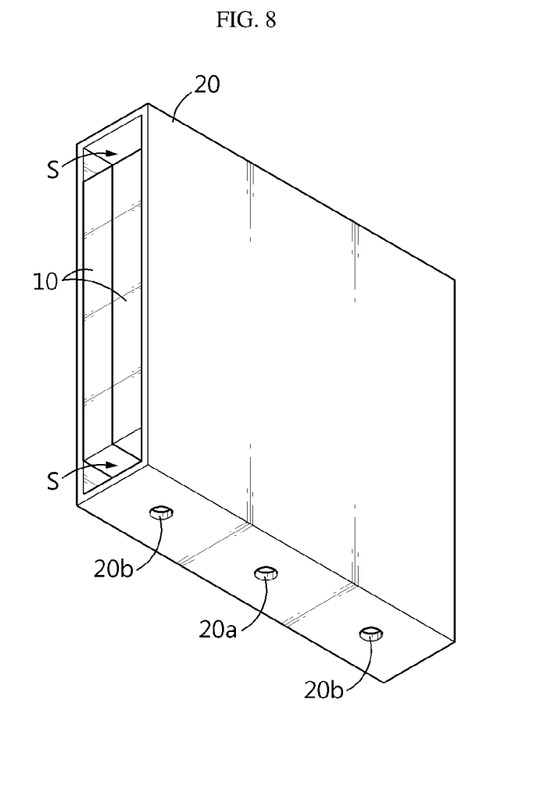
FIG. 8 is a perspective view showing the battery cell and the cartridge respectively depicted in FIGS. 5 and 6 coupled together.
Figure 9:
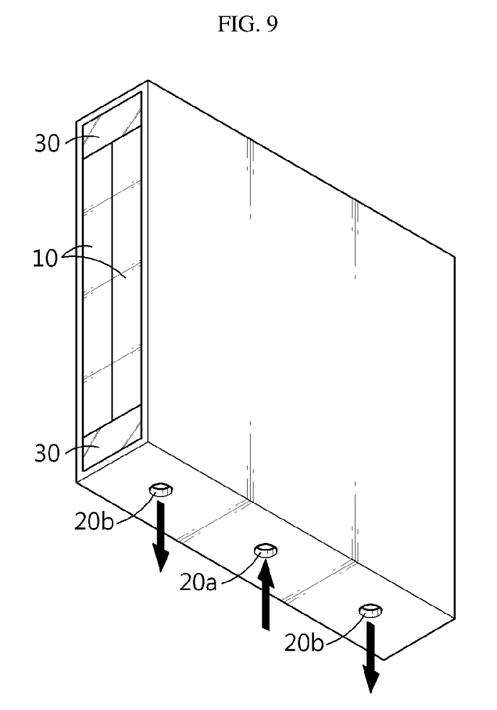
FIG. 9 is a perspective diagram for illustrating a process of completing the cell assembly by injecting a thermally conductive resin into the coupled unit of the battery cell and the cartridge depicted in FIG. 8.

FIG. 4 is a perspective view showing a cell assembly applied to the battery module according to an embodiment of the present disclosure, and FIG. 5 is a perspective view showing a battery cell provided to the cell assembly depicted in FIG. 4. Also, FIG. 6 is a perspective view showing a cartridge provided to the cell assembly depicted in FIG. 4. Also, FIG. 7 is a plan view showing a bottom surface of the cartridge depicted in FIG. 6, and FIG. 8 is a perspective view showing the battery cell and the cartridge respectively depicted in FIGS. 5 and 6 coupled together. Also, FIG. 9 is a perspective diagram for illustrating a process of completing the cell assembly by injecting a thermally conductive resin into the coupled unit of the battery cell and the cartridge depicted in FIG. 8.

First, referring to FIG. 4, each of the plurality of cell assemblies 121 employed at the battery module according to an embodiment of the present disclosure includes at least one battery cell 10, a cartridge 20 for accommodating the battery cell 10, and a thermally conductive resin layer 30 for filling an empty space between the battery cell 10 and the cartridge 20.

Referring to FIG. 5, the battery cell 10 is a pouch-type battery cell that includes an electrode assembly (not shown), a pouch case 11, a pair of electrode leads 14, and a pair of sealants 15 interposed between an inner surface of the pouch case 11 and the electrode lead 14.

Although not shown in the figures, the electrode assembly has a form in which separators are interposed between positive electrode plates and negative electrode plates, which are alternately stacked repeatedly, and the separators are preferably positioned at both outermost sides thereof for insulation.

The positive electrode plate includes a positive electrode current collector and a positive electrode active material layer coated on at least one surface thereof, and a positive electrode uncoated region not coated with the positive electrode active material is formed at one end thereof to protrude thereon. The positive electrode uncoated region functions as a positive electrode tab connected to the electrode lead 14.

Similarly, the negative electrode plate includes a negative electrode current collector and a negative electrode active material layer coated on at least one surface thereof, and an uncoated region not coated with the negative electrode active material layer is formed at one end thereof to protrude thereon. The uncoated region functions as a negative electrode tab connected to the electrode lead 14.

In addition, the separator is interposed between the positive electrode plate and the negative electrode plate to prevent electrode plates having different polarities from directly contacting each other, and the separator may be made of a porous material to ensure the transfer of ions between the positive electrode plate and the negative electrode plate through an electrolyte.

The pouch case 11 may include an upper case for covering an upper portion of the electrode assembly and a lower case for covering a lower portion thereof. Each of the upper case and the lower case may be made of a multilayer pouch film that includes a first resin layer corresponding to an innermost layer, a metal layer corresponding to an intermediate layer and a second resin layer corresponding to an outermost layer.

The first resin layer constituting the innermost surface of the pouch film may be made of a resin having thermal fusion such that the upper case and the lower case may be easily fused to each other when being heated in contact with each other. The first resin layer may adopt unstretched polypropylene, polypropylene, or mixtures thereof. The metal layer may adopt a metal with excellent thermal conductivity such as aluminum (Al). In addition, the second resin layer forming the outermost layer may adopt polyethylene terephthalate, nylon or mixtures thereof.

The pouch case 11 includes an accommodation portion 12 for accommodating the electrode assembly (not shown) and a sealing portion 13 extending in the circumferential direction of the accommodation portion 12 and thermally fused in a state where the electrode lead 14 is drawn outward to seal the pouch case 12.

The electrode lead 14 is classified into a positive electrode lead connected to the positive electrode tab and a negative electrode lead connected to the negative electrode tab, and each of the positive electrode lead and the negative electrode lead is drawn out of the pouch case 11. The figures of the present disclosure show only the case where the pair of electrode leads 14 are drawn in different directions. However, this is just an example, and the pair of electrode leads 14 may also be drawn in the same direction.

Meanwhile, the electrode leads 14 of the battery cell 10 are not shown in the figures except for FIG. 5, for the sake of convenience. As described above, the pair of electrode leads 14 of the battery cell 10 applied to the present disclosure may be drawn out at one side or both sides of the battery cell 10.

Next, referring to FIGS. 6 to 9, the cartridge 20 applied to the present disclosure has a rectangular parallelepiped frame shape having both open sides and an empty inside to accommodate the battery cell 10. When at least one battery cell 10 is accommodated therein, an outer surface of the battery cell 10 or the cell stack formed by stacking the battery cells 10 may come into contact with the inner surface of the cartridge 20. In addition, the cartridge 20 is preferably made of a metal material such as aluminum having excellent thermal conductivity in order to serve as a cooling fin that emits heat generated from the battery cell 10. Also, an insulation sheet may be interposed between the outer surface of the cell stack and the inner surface of the cartridge 20 to enhance insulation between the cartridge 20 made of a metal material and the battery cell 10.

In order to insert the cell stack into the accommodation space inside the cartridge 20 as described above, the accommodation space inside the cartridge 20 has a shape and size corresponding to the battery cell 10 or the cell stack.

Since the thermally conductive resin layer 30 should be formed inside the cartridge 20 as shown in FIG. 9, a predetermined space S is formed between the top end and the bottom end of the battery cell 10 (meaning the top and bottom based on FIG. 6) and the inner surface of the cartridge 20.

Referring to FIG. 7, the cartridge 20 has an injection hole 20a and a discharge hole 20b formed in a top surface and a bottom surface thereof. The injection hole 20a is formed at the longitudinal center portion of the top surface and the bottom surface of the cartridge 20 to function as an injection passage of a resin paste for forming the thermally conductive resin layer 30.

In addition, the discharge hole 20b is formed at both longitudinal ends of the top surface and the bottom surface of the cartridge 20 to identify whether the thermally conductive resin paste injected through the injection hole 20a fully fills the empty space S formed between the battery cell 10 or the cell stack and the cartridge 20. That is, if the thermally conductive resin paste starts being injected through the injection hole 20a located at the center portion of the bottom surface of the cartridge 20, the thermally conductive resin paste is filled from the longitudinal center portion of the cartridge 20 toward both side ends. Also, if the thermally conductive resin paste is discharged to the outside through the discharge hole 20b located at both longitudinal ends of the cartridge 20, a worker may identify that the empty space S is filled with the thermally conductive resin paste and stop the filling operation.

The thermally conductive resin layer 30 is a layer made of a material in which an additive giving thermal conductivity (for example, graphite) is added to a resin such as epoxy. The thermally conductive resin layer 30 is obtained by filling the thermally conductive paste in the empty space S between the battery cell 10 and the cartridge 20.

The thermally conductive resin layer 30 fills the empty space S in the cartridge 20 to fix the battery cell 10 inside the cartridge 20 and also prevents an empty space from being created between the lower portion of the battery cell 10 and the inner surface of the cartridge 20 such that heat is easily transferred from the battery cell 10 to the cartridge 20. As described above, considering that the thermally conductive resin layer 30 is used for fixing, a polymer binder component may be added in manufacturing the thermally conductive resin paste.

Meanwhile, in the battery module according to the present disclosure, since the plurality of cell assemblies 121 are stacked such that the resin is filled to each cell assembly 121 to perform coupling between the battery cell 10 and the cartridge 20, the density of the resin of the thermally conductive resin layer 30 may be distributed evenly as a whole.

If the battery module is fabricated in such a way that the plurality of battery cells 10 are not accommodated in the cartridge 20 but accommodated directly in the module case 110 and the space formed between the battery cell 10 and the module case 110 is filled with a resin, the density of the resin of the thermally conductive resin layer 30 may be distributed very non-uniformly at various locations.

That is, if the number of battery cells 10 accommodated in the module case 110 increases, the cell stack in which the battery cells 10 are collected becomes very thick. In this case, if the resin is injected by forming an injection hole in the top surface and/or the bottom surface of the module case 110, the density of the resin may show a great difference at positions close to and far from the injection hole. This may result in irregular product quality. However, in the battery module according to the present disclosure, since the resin fills the minimized space, the above problem may be solved.

Next, a heat dissipation path in the battery module according to an embodiment of the present disclosure will be described with reference to FIG. 10.

FIG. 10 is a diagram showing a path for cooling in the battery module according to an embodiment of the present disclosure.

Referring to FIG. 10, the heat generated from the battery cell 10 is moved along the arrow, thereby cooling the battery module.

That is, the heat generated from the battery cell 10 generally moves along two paths. One path is formed along the broad surface of the battery cell 10→the cartridge 20→the module case 110→the TIM layer 300→the heatsink 200 (a first path), and the other path is formed along the top end and the bottom end of the battery cell 10→the thermally conductive resin layer 30→the module case 110→the TIM layer 300→the heatsink 200 (a second path).

The battery module according to an embodiment of the present disclosure may realize efficient cooling by dissipating heat from the battery cell 10 through two paths. Further, since the thermally conductive resin layer 30 forming the second path not only improves the cooling efficiency but also allows the battery cell 10 to be easily fixed in the cartridge 20, it is possible to improve the reliability of the product.

In addition, in the battery module according to an embodiment of the present disclosure, the paste forming the thermally conductive resin layer 30 may be uniformly coated by injecting a thermally conductive resin individually into each cell assembly of the battery module. As a result, the fixing force between the battery cell 10 and the cartridge 20 may be increased, and the thermal conductivity between the bottom end of the battery cell 10 and the cartridge 20 may be maximized.

Meanwhile, a battery pack may be formed by stacking at least one battery module according to an embodiment of the present disclosure as described above, and the battery pack implemented in this way may also have excellent cooling efficiency and product reliability, like the battery module according to an embodiment of the present disclosure.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery module, comprising:
    a module body including a cell assembly stack formed by stacking a plurality of cell assemblies and a module case configured to accommodate the cell assembly stack therein; and
    a pair of heatsinks disposed at an upper portion and a lower portion of the module body, respectively, to dissipate heat transferred from the module case,
    wherein each of the cell assemblies includes:

a plurality of battery cells;

a cartridge configured to accommodate the battery cells therein, the cartridge being made of a metal material and configured to serve as a cooling fin, the cartridge having opposing first and second open sides each extending between the upper and lower portions of the module body, a largest planar surface of each battery cell being in contact with a respective inner surface of the cartridge; and a pair of thermally conductive resin layers filled in respective empty spaces formed between top ends of the battery cells and the cartridge and between bottom ends of the battery cells and the cartridge, the top and bottom ends of the battery cells being adjacent to the upper and lower portions of the module body, respectively, and wherein the pair of heatsinks are adjacent to the top and bottom ends of the battery cells, respectively, and wherein the battery module is configured such that heat generated in the battery cells is moved along: (a) a first path from the largest planar surface of each battery cell to the respective inner surface of the cartridge to the module case to the pair of heat sinks; and along (b) a second path from the top and bottom ends of the battery cells to the pair of thermally conductive resin layers to the module case to the pair of heat sinks.

2. The battery module according to claim 1,
wherein the cartridge has a rectangular parallelepiped shape.

3. The battery module according to claim 1,
wherein the top end and the bottom end of the battery cell are in contact with a respective one of the pair of thermally conductive resin layers.

4. The battery module according to claim 1,
wherein the cartridge has at least one injection hole for injecting a resin paste to form the thermally conductive resin layer and at least one discharge hole for discharging the injected resin, and wherein the at least one injection hole and the at least one discharge hole are formed in a top surface and a bottom surface of the cartridge, the top and bottom surfaces of the cartridge being adjacent to the upper and lower portions of the module body, respectively.

5. The battery module according to claim 4,
wherein the at least one injection hole is formed at a center portion of the bottom surface of the cartridge, and wherein the at least one discharge hole is a plurality of discharge holes formed at respective opposing longitudinal ends of the bottom surface of the cartridge.

6. The battery module according to claim 4,
wherein the at least one injection hole is formed at a center portion of the top surface of the cartridge, and wherein the at least one discharge hole is a plurality of discharge holes formed at respective opposing longitudinal ends of the top surface of the cartridge.

7. The battery module according to claim 1, further comprising:
a pair of thermal interface material (TIM) layers, each of the pair of thermal interface material layers being interposed between the module body and a respective one of the pair of heatsinks.

8. A battery pack, comprising at least one battery module according to claim 1.

* * * * *